US011817746B2

(12) United States Patent
Nam et al.

(10) Patent No.: US 11,817,746 B2
(45) Date of Patent: Nov. 14, 2023

(54) 2-SEGMENT QUASI-HALBACH ROTOR OF MOTOR

(71) Applicants: POSTECH Research and Business Development Foundation, Pohang-si (KR); EPT Co., Inc., Pohang-si (KR); KNR System, Inc., Yongin-si (KR)

(72) Inventors: Kwang Hee Nam, Gyeongju-si (KR); Jae Hak Kim, Yongin-si (KR); Sang Moo Lee, Yongin-si (KR); Myoung Han Kim, Yongin-si (KR); Bon Kil Koo, Pohang-si (KR)

(73) Assignees: POSTECH RESEARCH AND BUSINESS DEVELOPMENT FOUNDATION, Pohang-si (KR); KNR SYSTEM, INC., Yongin-si (KR); EPT CO., INC., Pohang-si (KR)

( * ) Notice: Subject to any disclaimer, the term of this patent is extended or adjusted under 35 U.S.C. 154(b) by 0 days.

(21) Appl. No.: 17/533,029

(22) Filed: Nov. 22, 2021

(65) Prior Publication Data
US 2022/0166273 A1    May 26, 2022

(30) Foreign Application Priority Data

Nov. 23, 2020  (KR) ......................... 10-2020-0157851

(51) Int. Cl.
| H02K 1/00 | (2006.01) |
| H02K 1/276 | (2022.01) |
| H02K 1/2793 | (2022.01) |
| H02K 1/2786 | (2022.01) |

(52) U.S. Cl.
CPC ......... *H02K 1/2766* (2013.01); *H02K 1/2786* (2013.01); *H02K 1/2793* (2013.01); *H02K 2213/03* (2013.01)

(58) Field of Classification Search
CPC .. H02K 1/2766; H02K 1/2786; H02K 1/2793; H02K 2213/03; H02K 1/2783; H02K 1/2795; H02K 1/2796; H02K 1/2792; H02K 21/022; H02K 1/27; H02K 15/03
See application file for complete search history.

(56) References Cited

U.S. PATENT DOCUMENTS

| 11,456,637 B2 * | 9/2022 | Sakauchi ............... H02K 1/146 |
| 2003/0057791 A1 * | 3/2003 | Post ...................... H02K 21/025 |
| | | 310/191 |
| 2014/0084731 A1 * | 3/2014 | Iwami ..................... H02K 1/02 |
| | | 310/156.07 |

(Continued)

FOREIGN PATENT DOCUMENTS

| JP | 62-122468 A | 6/1987 |
| JP | 11-308793 A | 11/1999 |
| JP | 11308793 A * | 11/1999 |

(Continued)

*Primary Examiner* — Ahmed Elnakib
*Assistant Examiner* — Elrasheed E. B. Hamdan
(74) *Attorney, Agent, or Firm* — Morgan, Lewis & Bockius LLP (57) ABSTRACT

The present invention relates to a rotor of motor, and more particularly, to a 2-segment quasi-Halbach rotor of motor that includes a radial magnet and a circumferential magnet which are Halbach-arrayed and a back iron providing a flux to reduce a thickness of the magnet and acquire high air-gap flux density.

7 Claims, 6 Drawing Sheets

(56) References Cited

U.S. PATENT DOCUMENTS

2015/0357870 A1* 12/2015 Hazeyama ........... H02K 1/2766
　　　　　　　　　　　　　　　　　　　　310/156.07
2017/0353078 A1* 12/2017 Post ..................... F16C 32/041

FOREIGN PATENT DOCUMENTS

| | | | |
|---|---|---|---|
| JP | 11308793 A | * | 11/1999 |
| JP | 2001-516550 A | | 9/2001 |
| JP | 2012-228072 A | | 11/2012 |
| JP | 2012228072 A | * | 11/2012 |
| JP | 2012228072 A | * | 11/2012 |
| JP | 2020054175 A | | 4/2020 |
| WO | 2013/008284 A1 | | 1/2013 |
| WO | 2014/115655 A1 | | 7/2014 |

* cited by examiner

2-SEGMENT QUASI-HALBACH ROTOR OF MOTOR

CROSS-REFERENCE TO RELATED APPLICATION

This application claims priority under 35 U.S.C. § 119 to Korean Patent Application No. 10-2020-0157851, filed on Nov. 23, 2020, in the Korean Intellectual Property Office, the disclosure of which is incorporated herein by reference in its entirety.

DESCRIPTION

Field of the Invention

The following disclosure relates to a rotor of motor, and more particularly, to a 2-segment quasi-Halbach rotor of motor that includes a radial magnet and a circumferential magnet which are Halbach-arrayed and a back iron providing a flux to reduce a thickness of the magnet and acquire high air-gap flux density.

Description of the Related Art

Motors are gradually increasing in speed to meet the demand for miniaturization, and thus, a dynamo system capable of high-speed operation is required. In order to satisfy both high-speed operation and high power, a weight of a rotor needs to be reduced. To this end, a Halbach motor has been used. The Halbach motor refers to a motor magnetized so that a magnetization direction of the magnet provided in the rotor is close to a sine wave.

Figure 1:
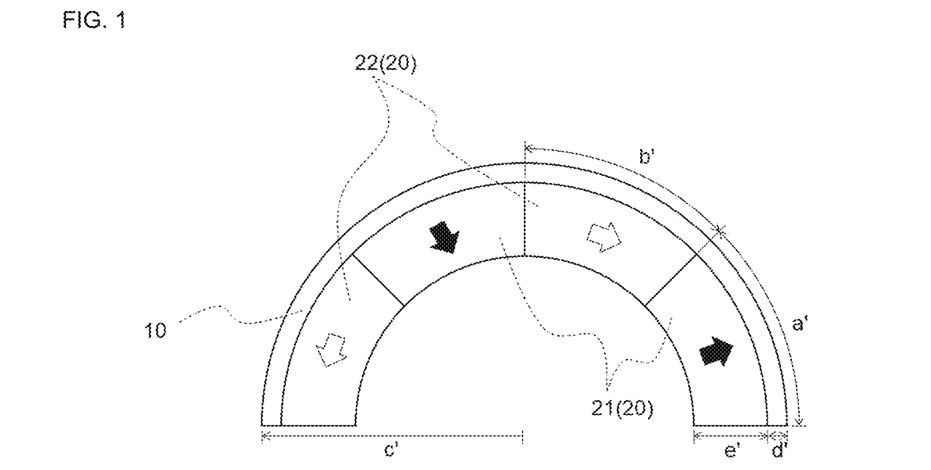
FIG. 1 is a diagram illustrating half of a side of a conventional two-segment Halbach rotor of motor.

FIG. 1 illustrates half of a side of a conventional 2-segment Halbach rotor of motor. As illustrated, the Halbach rotor of motor includes a sleeve 10 and a magnet 20. The sleeve 10 is a device for supplementing mechanical rigidity of the rotor, and is made of materials such as Inconel, titanium, and carbon fiber with high yield stress and is provided on an outside of an outer circumferential surface of the magnet 20 to prevent scattering of the magnet 20 during high-speed rotation of the rotor. The magnet 20 may be segmented into a radial magnet 21 magnetized in a radial direction and a circumferential magnet 22 magnetized in a circumferential direction according to the magnetized direction. Here, the radial magnet 21 and the circumferential magnet 22 are arranged alternately to each other, and arranged so that the magnetization directions are arranged in a periodic order like a sine wave.

The Halbach rotor of motor is characterized in that a radial flux generated from the radial magnet 21 forms a flux path through the circumferential magnet 22, and does not require a separate rotor core for the flux path, so the weight of the rotor may be reduced and high-speed rotation is possible. It is common that the conventional Halbach motor as described above acquires maximum air-gap flux density by designing an outer arc length a' of the radial magnet 21 and an outer arc length b' of the circumferential magnet 22 to be the same length. Here, the radial flux generated from the radial magnet 21 is proportional to the arc length a' of the radial magnet 21, and the circumferential flux generated from the circumferential magnet 22 is proportional to a thickness e' of the circumferential magnet 22. Therefore, in order for all of the radial fluxes to be coupled with the circumferential fluxes to form a path, half the magnitude of the radial flux needs to be equal to the magnitude of the circumferential flux, so the thickness e' of the magnet needs to be about a'/2. However, such a conventional Halbach motor has the following problems.

First, a size of an outer radius c' of the rotor is limited. Specifically, during the high-speed operation of the rotor, when stress on a surface of a rotating body is greater than yield stress of a material of the rotating body, the rotating body is deformed, which may increase eccentricity of the rotating body, and as a result, cause structural collapse of the rotating body. Here, the outer radius c' of the rotor determines a surface speed of the rotor, and the stress on the surface increases in proportion to the surface speed of the rotor. Therefore, in general, in order to satisfy the surface speed of the rotor of 100 to 250 m/s, the size of c' may be inevitably limited to prevent the structural collapse of the rotor.

Second, the thickness e' of the magnet is large. Specifically, it is preferable to design the rotor with low inertia because an increase in inertia of the rotor limits the high-speed operation of the rotor. However, as described above, in the conventional Halbach motor, the thickness e' of the magnet is determined to be about ½ corresponding to the outer arc lengths a and b of the magnet. When the rotor is designed with a low pole (2 segment) for high-speed operation, the a' and b' are designed to be relatively long, so the thickness e' of the magnet is inevitably designed to be as long as a'/2 of the outer arc length of the magnet. This increases the weight of the rotor, making high-speed operation difficult as the inertia of the rotor increases, and furthermore, it is not preferable in terms of cost in that the size of the magnet needs to be designed relatively large.

RELATED ART DOCUMENT

Patent Document (Patent Document 1) U.S. Pat. No. 6,906,446 (Mar. 27, 2003)

DISCLOSURE

Technical Problem

An embodiment of the present invention is directed to providing a Halbach rotor of motor that includes a back iron providing a path so that inter-pole leakage flux leads to other magnets to reduce a thickness of a magnet, thereby enabling high-speed operation and saving manufacturing costs of the rotor and facilitating manufacturing of the rotor.

Technical Solution

In one general aspect, a 2-segment quasi Halbach rotor of motor includes a plurality of magnets that include a radial magnet and a circumferential magnet that are Halbach-arrayed along a circumferential direction, and a back iron that is provided on one side of the plurality of magnets so as to face one surface of the plurality of magnets, in which the back iron provides a path so that an inter-pole leakage flux generated from any one inner radial magnet of the plurality of magnets leads to another outer radial magnet near the any one inner radial magnet.

An outer arc length of the radial magnet may be longer than that of the circumferential magnet.

An outer arc length a of the radial magnet, an outer arc length b of the circumferential magnet, a thickness e of the plurality of magnets, and a thickness f of the back iron may be provided as design variables, and thus, as the a, b, e, and f are changed, air-gap flux density of the rotor may change.

Here, 0.52≤a/(a+b)≤0.81, and 0.46≤e/(e+f)≤0.82.

Here, 0.58≤a/(a+b)≤0.73, and 0.51≤e/(e+f)≤0.72.

The a and f may have a nonlinear proportional relationship.

The radial magnet may be formed of a plurality of unit radial magnets having the same size and shape as each other, and each of the unit radial magnets and the circumferential magnets may have the same size and shape as each other.

Here, a/(a+b)=0.75, the radial magnet may be formed of three unit radial magnets having the same size and shape as each other, and each of the unit radial magnets and the circumferential magnets may have the same size and shape as each other.

Here, 0.46≤e/(e+f)≤0.63.

The back iron may be disposed inside the plurality of magnets to face an inner circumferential surface of the plurality of magnets, and a plurality of non-slip bumps protruding in a radial direction and spaced apart from each other in the circumferential direction may be provided on an outer circumferential surface of the back iron.

Grooves may be formed at both ends of an inner side surface of each of the plurality of magnets, and the non-slip bumps may be inserted into the grooves, and each of the plurality of magnets may be arranged between each of the plurality of non-slip bumps.

The 2-segment quasi Halbach rotor of motor may further include a sleeve that is provided on the outside of the plurality of magnets to surround the plurality of magnets.

The back iron may be disposed outside the plurality of magnets so as to face an outer circumferential surfaces of the plurality of magnets.

A method of manufacturing a 2-segment quasi Halbach rotor of motor may include 1) preparing a plurality of non-magnetized magnets, 2) magnetizing only some of the plurality of non-magnetized magnets in a circumferential direction, 3) installing the magnetized magnet in the circumferential direction to the back iron, and installing remaining magnets that are not magnetized in remaining positions of the back iron, and 4) magnetizing the remaining magnets, which are not magnetized, in a radial direction.

Advantageous Effects

According to the present invention, as the back iron provides a path so that an inter-pole leakage flux generated from a radial magnet leads to other radial magnets, a thickness of the radial magnet may be reduced and the radial magnet is configured to be large to increase a fundamental component. As a result, the rotor has low inertia and high air-gap flux density.

In addition, it is possible to prevent a magnet from sliding, increase structural safety, and improve manufacturing performance of a rotor by a non-slip bump structure.

DETAILED DESCRIPTION OF THE EMBODIMENTS

Hereinafter, the present invention will be described in detail with reference to the accompanying drawings.

Figure 2:
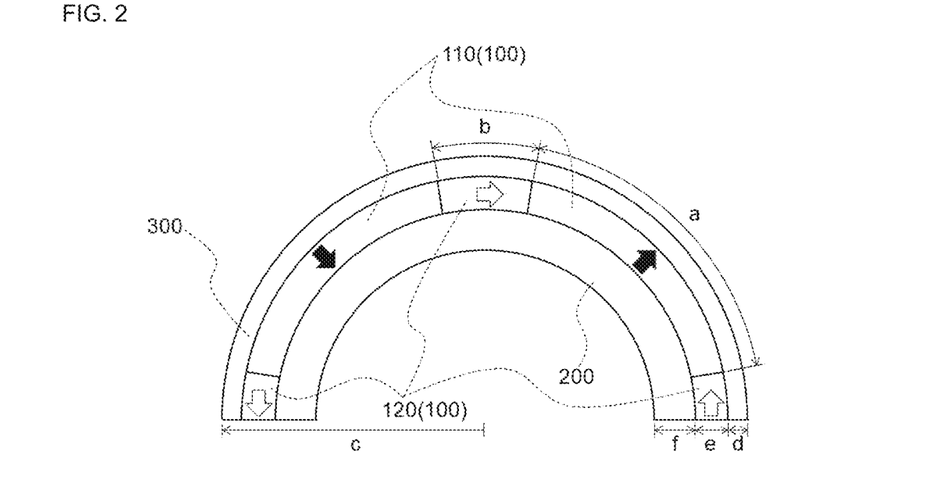
FIG. 2 is a diagram illustrating half of a side of a 2-segment quasi-Halbach rotor of motor according to an example of the present invention.

FIG. 2 illustrates half of a side of a 2-segment quasi-Halbach rotor of motor according to an example of the present invention. As illustrated, the rotor of the present invention largely includes a plurality of magnets 100 and a back iron 200, and may further include a sleeve 300. The sleeve 300 may be provided outside the plurality of magnets 100 to surround the plurality of magnets 100.

The plurality of magnets 100 are permanent magnets, and each magnet includes a radial magnet 110 magnetized in a radial direction and a circumferential magnet 120 magnetized in a circumferential direction according to a magnetization direction, and the radial magnet 110 and the circumferential magnet 120 are Halbach-arrayed along the circumferential direction.

Describing in detail through FIG. 2 for the plurality of magnets 100 which are Halbach-arrayed, the circumferential magnet 120 magnetized in a counterclockwise direction is arranged in a lower left position in FIG. 2, the radial magnet 110 magnetized in the inner radial direction is arranged in a next position along a clockwise direction, the circumferential magnet 120 magnetized in the clockwise direction is arranged in a next position, the radial magnet magnetized in an external radial direction is arranged in a next position, and the circumferential magnet 120 magnetized in the counterclockwise direction is arranged at a lower right position in FIG. 2. In this way, the radial magnet 110 and the circumferential magnet 120 are alternately arranged to each other, and the magnetization directions of each magnet 110 and 120 may be arranged in a periodic order like a sine wave. Although the other half of the rotor is not illustrated in the drawing, the magnets 110 and 120 may be arranged according to the order rule as above.

The back iron 200 is disposed on one side of the plurality of magnets 100 to face one surface of the plurality of magnets 100. Here, one surface may mean an inner circumferential surface of the plurality of magnets 100 as illustrated in FIG. 2, and may mean an outer circumferential surface or a side surface of the plurality of magnets 100 as will be described later. The back iron 200 corresponds to a rotor core, and forms a path so that an inter-pole leakage flux generated from any one inner radial magnet 120 of the plurality of magnets 100 leads to the other magnets 110 and 120 near any one inner radial magnets 120.

Specifically, as described through FIG. 1, the conventional Halbach rotor of motor is generally configured so that an outer arc length a' of the radial magnet 21 is equal to an outer arc length b' of the circumferential magnet 22. In this case, the conventional Halbach rotor of motor has a structure that minimizes the inter-pole leakage flux in the radial magnet 21 by setting a thickness e' of each magnet 21, 22 to about half the outer arc lengths a' and b' of each magnet 21 and 22. On the other hand, according to the present invention, as illustrated in FIG. 2, the outer arc length a of the radial magnet 110 is longer than the outer arc length b of the circumferential magnet 120 to intentionally generate inter-pole leakage flux from the radial magnet 110, and make the inter-pole leakage flux generated from the radial magnet 110 lead to other magnets through the back iron 200.

Figure 3:
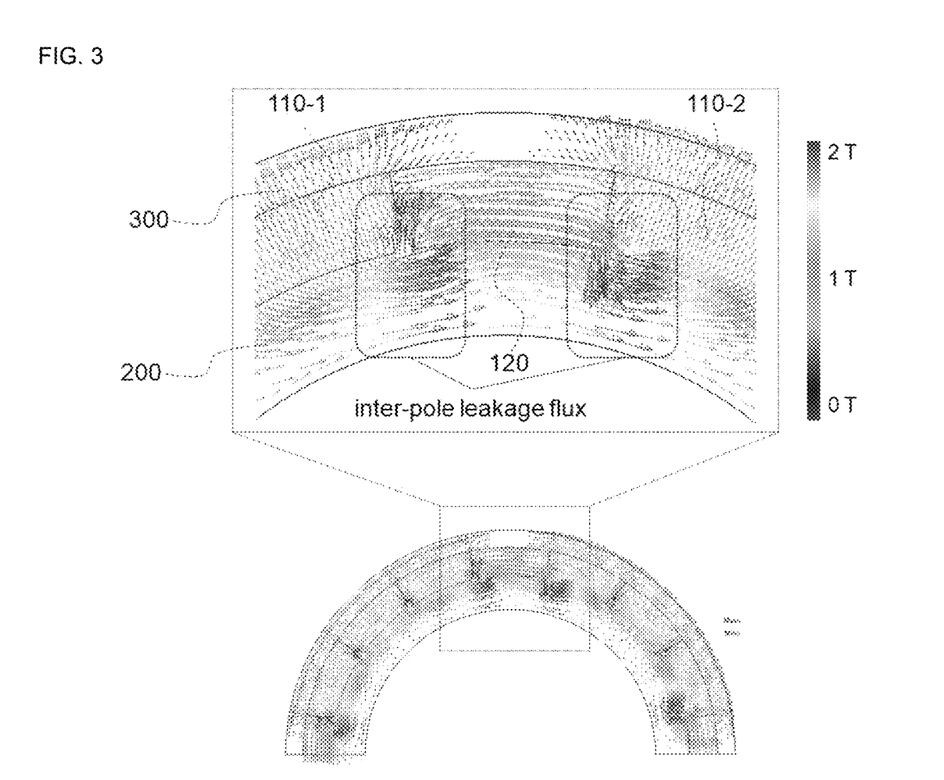
FIG. 3 is a diagram illustrating finite element analysis results for a flux direction at an interface between a radial magnet and a circumferential magnet.

More specifically, FIG. 3 illustrates results of finite element analysis (FEA) for the flux direction at the interface between the radial magnet and the circumferential magnet. Here, all the radial fluxes generated from any one first radial magnet 110-1 do not flow into the circumferential flux 120, but fluxes leaked to other locations correspond to the inter-pole leakage flux. Specifically, the flux near the interface with the circumferential magnet 120 among the fluxes generated from the first radial magnet 110-1, which is any one inner radial magnet, may directly lead to the circumferential magnet 120, and thus, lead to another outer radial magnet, a second radial magnet 110-2 through the circumferential magnet 120, and a flux near a middle portion may lead to the back iron 200 among the fluxes generated from the first radial magnet 110-1, and thus, lead to the second radial magnet 110-2 via the radial magnet 120 through the back iron 200 or directly lead to the second radial magnet 110-2 through the back iron 200 without passing through the radial magnet 120.

As such, the present invention does not reduce the amount of inter-pole leakage flux at the interface of each magnet, but solves this problem by including the back iron that may sufficiently handle the amount of inter-pole leakage flux that is inevitable due to structural limitations. That is, according to the present invention, as the inter-pole leakage flux intentionally generated from the radial magnet is distributed into the circumferential flux and the flux through the back iron to form a path, the thickness of the radial magnet and the circumferential magnet may be reduced. Here, since the inter-pole leakage flux generated from the radial magnet leads to other magnets through the back iron, the inter-pole leakage flux generated from the radial magnet is no longer leakage flux when viewed from the entire side of the rotor, and as a result, the efficiency of the magnet increases. In addition, when the back iron is provided, it is possible to more reliably reduce the leaked and wasted flux when viewed from the overall side of the rotor, and thus, to further increase the efficiency of the magnet.

Furthermore, according to the present invention, it is possible to expand the design range such as the thickness of the magnet and the arc length by including the back iron. As described above in the background art, the conventional Halbach rotor may not increase the size of the outer radius of the rotor, and requires a large number of magnets to reduce the thickness of the magnet, which increases manufacturing costs of the rotor and makes manufacturing difficult. Accordingly, when the number of magnets is reduced, there is a structural limit in that the thickness of the magnet inevitably increases. On the other hand, according to the present invention, since the back iron provides a path for a flux to move so that the inter-pole leakage flux generated from the radial magnet is not completely leaked to the outside of the rotor and moves to other magnets, the thickness of the magnet and the number of magnets may be reduced, thereby enabling the high-speed operation and reducing the manufacturing costs of the rotor.

Specifically, the radial magnet 110 generates the radial flux that contributes to a torque of the rotor, and the circumferential magnet 120 leads to the path between the outer radial flux and the inner radial flux generated from the radial magnet 110. In this way, since the air-gap flux contributing to the torque of the actual rotor is the radial flux generated from the radial magnet 100, in order to increase the fundamental component of the air gap flux, it is advantageous to lengthen the arc length a of the radial magnet 110. By adjusting a size of a thickness f of the back iron 200 in response to the arc length a of the radial magnet 110, it is possible to derive the optimal efficiency between the size of the rotor and the air-gap flux. That is, by using the arc length a of the radial magnet 110, the arc length b of the circumferential magnet 120, the thickness e of the radial magnet 110, and the thickness f of the back iron 200 as the design variables, it is possible to maximize the air-gap flux and minimize the entire size, rotational inertia, or the like of the rotor. To this end, in the present invention, a relationship between each variable is derived using $a/(a+b)=\alpha$ and $e/(e+f)=\delta$ as parameters.

Figure 4:
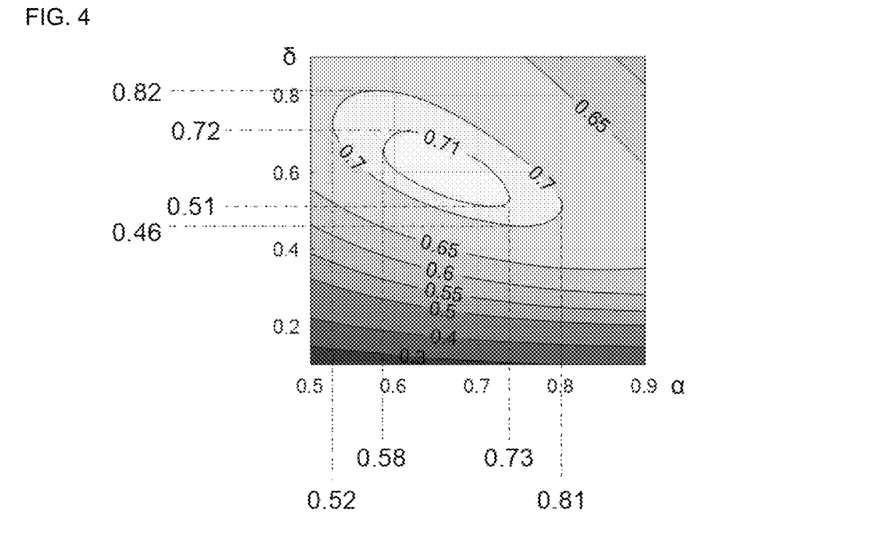
FIG. 4 is a graph illustrating results of finite element analysis of a flux density contour using α and δ as variables in a rotor of the present invention.

FIG. 4 is a graph illustrating the results of the finite element analysis of a flux density contour using $\alpha$ and $\delta$ as variables in the rotor of the present invention. On the graph, an x-axis uses $\alpha$ as a variable and a y-axis uses $\delta$ as a variable. As illustrated, when á is about 0.52 or more and 0.81 or less and $\delta$ is about 0.46 or more and 0.82 or less, it can be seen that the flux density of the rotor is formed as high as 0.7. More preferably, it can be seen that when $\alpha$ is about 0.58 or more and 0.73 or less and $\delta$ is about 0.51 or more and 0.72 or less, the air-gap flux density of the rotor is 0.71, which is the highest. Therefore, according to the present invention, by designing the rotor so that $\alpha$ and $\delta$ fall within the above-mentioned range, it is possible to maximally increase the air-gap flux density of the rotor.

In this case, each of $\alpha$ and $\delta$ falls within the above-described range, but $\alpha$ and $\delta$ are in inverse proportion to each other. For example, when $\alpha$ is 0.52, $\delta$ may correspond to 0.82, and when $\alpha$ is 0.81, $\delta$ may correspond to 0.46. In other words, the arc length a of the radial magnet and the thickness e of the back iron have a non-linearly proportional relationship. When the arc length a of the radial magnet increases, the radial flux increases, and thus, the inter-pole leakage flux increases. In order to prevent the increasing inter-pole leakage flux from completely leaking to the outside of the rotor, the thickness e of the back iron needs to increase. Accordingly, it can be seen that a and e generally have a proportional relationship.

Figure 5:
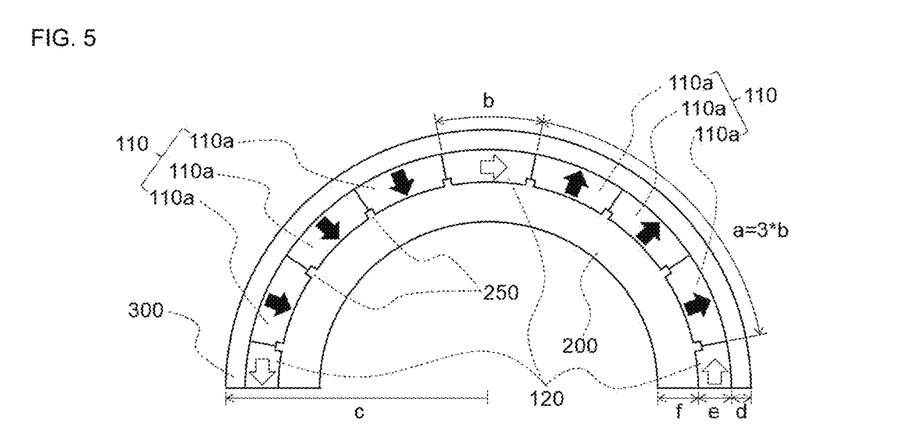
FIG. 5 is a diagram illustrating half of a side of a 2-segment quasi-Halbach rotor of motor according to another example of the present invention.

Meanwhile, in order to increase the manufacturing performance of the rotor, in the present invention, each magnet constituting a plurality of magnets may be made to have the same size and shape. To this end, the radial magnet 110 may be formed of a plurality of unit radial magnets 110a having the same size and shape as each other, and each unit radial magnet 110a has the same size and shape as the circumferential magnet 120. By doing so, all of the magnets may be formed identically. However, the same as used in the present invention does not mean physically identical, but means substantially the same within the limit that allows an error range.

As a specific example, in the present invention, in particular, by designing $\alpha=0.75$, a ratio between the arc length a of the radial magnet and the arc length b of the circumferential magnet may satisfy a:b=3:1. In this case, the radial magnet may be segmented into three so that the radial magnet is formed of three unit radial magnets 110a. That is, FIG. 5 illustrates half of a side of a 2-segment quasi-Halbach rotor of motor according to another example of the present invention. Compared with the rotor illustrated in FIG. 2, there is a difference that the radial magnet 110 is formed of three units of the radial magnet 110a. As such, a:b satisfies 3:1, and as a is segmented into three, the size and shape of the circumferential magnet 120 and the size and shape of each of the unit radial magnets 110a may all be formed identically. In this way, since the size and shape of each of the magnets constituting a plurality of magnets are all formed identically, it is only necessary to mass-produce magnets having the same size and change only the magnetization direction, thereby reducing the manufacturing cost of the rotor and increasing the manufacturing performance of the rotor. In addition, an eddy current loss caused by the longer outer arc in the radial magnet is reduced, which is desirable in terms of the magnet efficiency.

Figure 6:
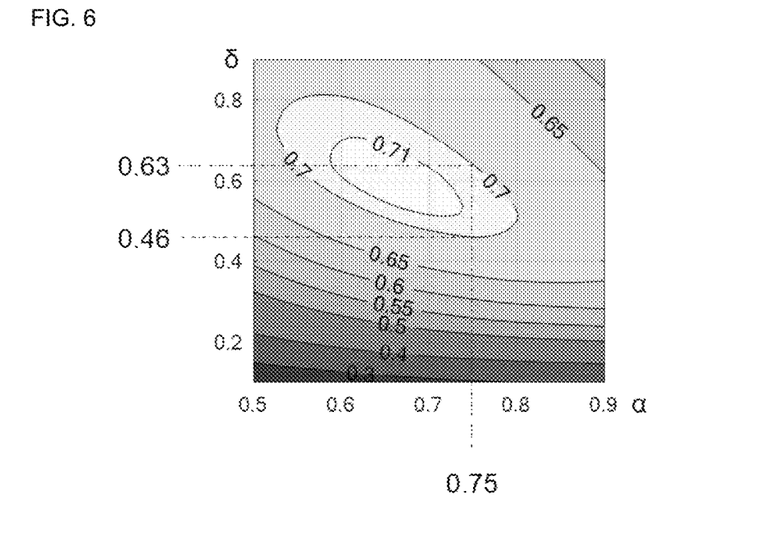
FIG. 6 is a diagram a range of δ when α=0.75 in the graph of FIG. 4.

In this case, that is, when $\alpha=0.75$ is satisfied, b is preferably 0.46 or more and 0.63 or less, and more preferably $\delta=0.46$. That is, as illustrated in FIG. 6, when $\alpha=0.75$, in a case where $\delta$ has a value between 0.46 and 0.63, the flux density becomes 0.7 or more, so that the magnet has high efficiency. In this case, in the above range, $\delta$ is the smallest as 0.46, which corresponds to a value that may design e, that is, the smallest thickness of the magnet, so $\delta$ is more preferably 0.46.

In the present invention, it has been described as a specific example that a:b may satisfy 3:1, but a:b may satisfy 2:1, 4:1, 5:1, . . . . In this case, when a:b is 2:1, a may be formed of two unit radial magnets, when a:b is 4:1, a may be formed of four unit radial magnets, and when a:b is 5:1, a may be formed of 5 unit radial magnets. However, when a:b is 5:1, a/(a+b)=0.83, which is out of the optimum air-gap flux density range of the rotor, and thus, in order to satisfy the optimum air-gap flux density range, it is preferable that a:b is any one of 2:1, 3:1, or 4:1. At the same time, reviewing the manufacturing performance, size, and the like of the rotor, when the number of magnets is too large, the assembly man-hour increases accordingly, and the manufacturing efficiency of the rotor decreases, and when the number of magnets becomes too small, the outer arc length a of the radial direction increases, and the thickness f of the back iron increases accordingly. Therefore, when considered comprehensively, it can be said that it is the most preferable embodiment that a:b satisfies 3:1 as described above.

Furthermore, although not illustrated, the circumferential magnet may also be formed of a plurality of unit circumferential magnets having the same size and shape as each other, and the unit radial magnet may again be formed of a plurality of smaller unit magnets. For example, when a:b satisfies 3:1, the circumferential magnet is formed of two unit magnets, and the radial magnet may be formed of six unit magnets to correspond to the circumferential magnet. Generally, when a:b satisfies n:1, the total number of unit magnets of the radial magnet may be n times the total number of unit magnets of the circumferential magnet.

Figure 7:
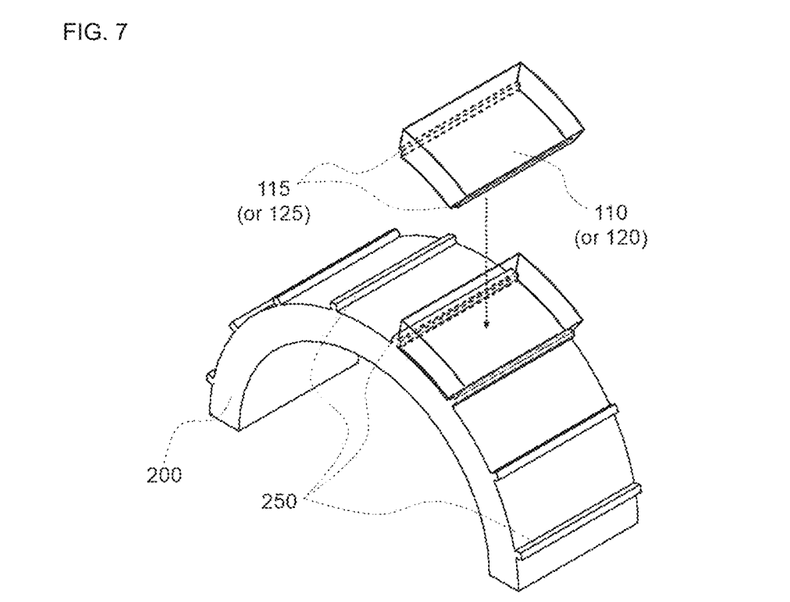
FIG. 7 is an exploded perspective view of the rotor according to an embodiment of the present invention.

Meanwhile, in the rotor according to the present invention, the back iron 200 may be disposed inside the plurality of magnets 100 so as to face the inner circumferential surface of the plurality of magnets 100, and a plurality of non-slip bumps 250 that protrude and are spaced apart from each other in the circumferential direction may be provided on the outer circumferential surface of the back iron 200. FIG. 7 is an exploded perspective view of the rotor according to an embodiment of the present invention. As illustrated, the back iron 200 may be provided with the plurality of non-slip bumps 250 protruding outward from the outer circumferential surface of the back iron 200.

In particular, according to the present invention, as a 3-segmented radial magnet 110, three unit radial magnets 110a and one circumferential magnet 120 may form one pole. In this case, four magnets 110a and 120 may be fixedly attached to the surface of the back iron 200. However, when a surface temperature of the back iron 200 rises to a high temperature, an adhesive force is weakened, and thus, the magnet may slip. In particular, in a case where speed pulsation occurs due to instantaneous load during high-speed operation, in case of high-speed acceleration/deceleration, in a case where a rotation direction changes rapidly, and the like, surface slippage of the magnet may occur. Such surface slippage acts as an obstacle to motor control, such as misalignment with a stator and a control angle error. In order to prevent the surface slippage of the magnet, the present invention may further include a non-slip bump on the outer circumferential surface of the back iron as an anti-slip structure, and thus, fix the magnet in the rotor more firmly than the structure in which the magnet is simply attached and fixed. Accordingly, it is possible to prevent control failure and increase control efficiency by reducing the control angle error. At the same time, the non-slip bump supports the magnet during the magnet assembly process and facilitates assembly.

Figure 8:
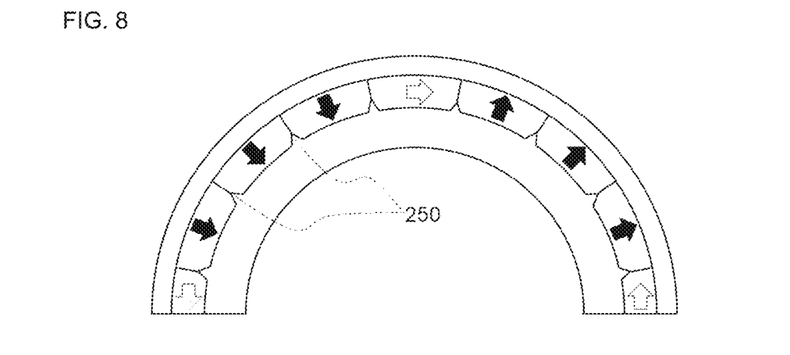
FIG. 8 is a side cross-sectional view of the rotor for describing a shape of a non-slip bump according to the present invention.

Here, grooves 115 and 125 corresponding to the non-slip bumps 250 are formed at both ends of the inner side surfaces of the magnets 110 and 120, and the non-slip bumps 250 are inserted into the grooves 115 and 125, so each of the magnets 110 and 120 may be arranged between the respective non-slip bumps 250. This may reduce the gap between magnets and maximize space utilization. Meanwhile, in FIG. 7, the non-slip bump 250 having a rectangular cross-section and the magnetic grooves 115 and 125 corresponding thereto are illustrated, but the cross-sectional shape of the non-slip bump 250 may be a triangular shape as illustrated in FIG. 8. Although not illustrated, the cross-sectional shape of the non-slip bump 250 may be formed in various shapes such as a circle, a round rectangle, and the like. When the non-slip bump has a triangular shape, it is possible to prevent the magnet from breaking when assembling the rotor or rotating the rotor, make the magnet assembly easier, and reduce the amount of flux leaking by the non-slip bump. Meanwhile, as a structure opposite to the above, one or more protruding structures are formed on the inner side surface of each magnet, and groove structures corresponding to the protruding structure is formed on the outer circumferential surface of the back iron. A coupling structure may be configured in such a way that both the protruding structures and the groove structures are coupled.

Figure 9:
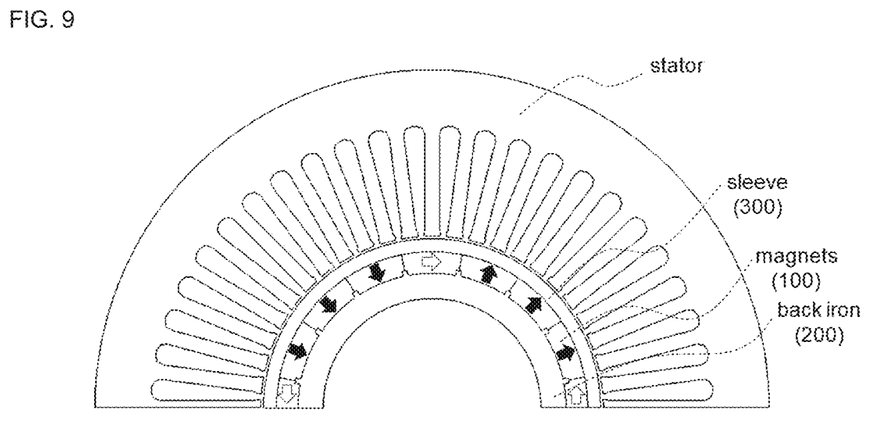
FIG. 9 is a schematic diagram of a 2-segment Halbach motor including the rotor according to the embodiment of the present invention.

FIG. 9 is a schematic diagram of a 2-segment Halbach motor including the rotor according to the embodiment of the present invention, and illustrates a motor in which the rotor is disposed inside the stator. On the other hand, it is described by way of example that the rotor of the present invention described above is a rotor applicable to an inner motor in which the plurality of magnets 100 are disposed outside the back iron 200, and a sleeve 300 is disposed outside the plurality of magnets 100, but the present invention is applicable to an outer motor, a linear motor, an axial motor, or a double axial motor.

Figure 10:
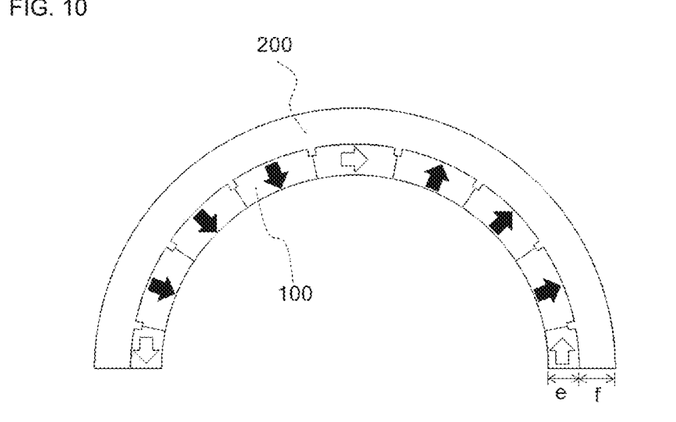
FIG. 10 is a diagram illustrating the rotor applicable to an outer motor.
Figure 11:
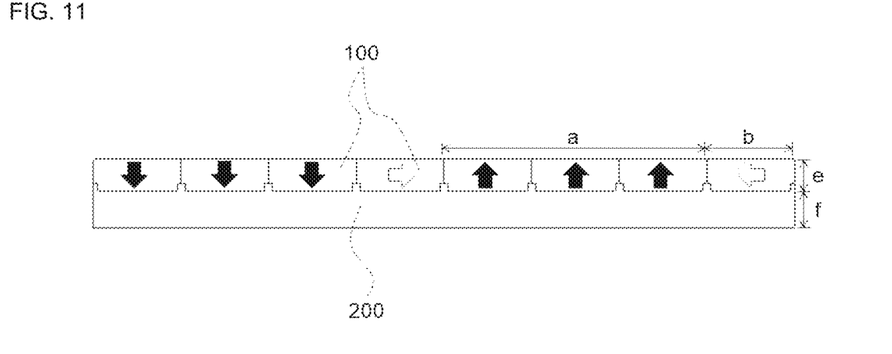
FIG. 11 is a diagram illustrating the rotor applicable to a linear motor.
Figure 12A:
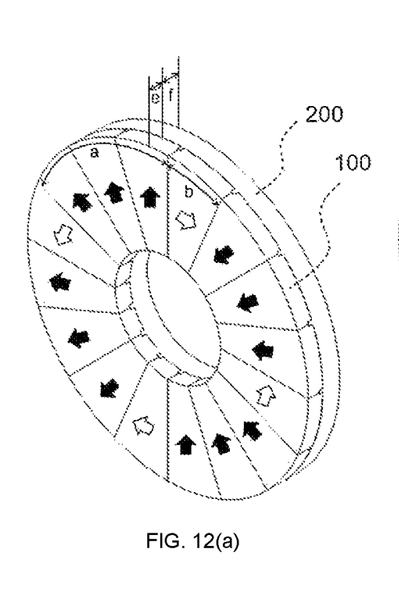
FIGS. 12A and 12B are diagrams illustrating the rotor applicable to axial motors.
Figure 12B:
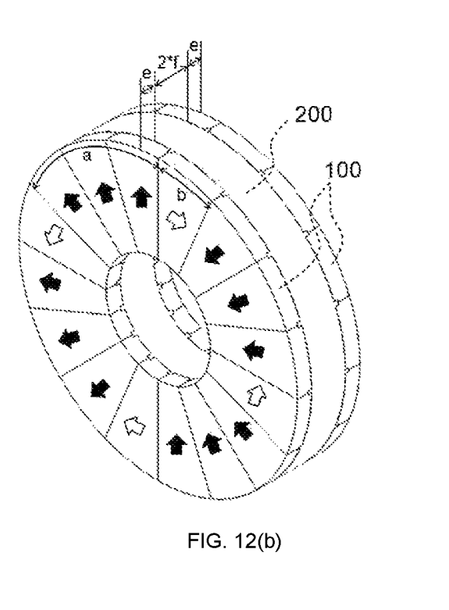

That is, FIG. 10 illustrates a rotor applicable to an outer motor, in which the back iron 200 may be disposed on the outside of the plurality of magnets 100 to face the outer circumferential surface of the plurality of magnets 100, and FIG. 11 illustrates a rotor applicable to a linear motor, in which the back iron 200 may be disposed under the plurality of magnets 100 to face a lower surface of the plurality of magnets 100 arranged in a straight line. When applied to an outer motor or a linear motor, there is an advantage that a sleeve for structural rigidity is not required on the side of the magnet gap. In addition, FIGS. 12A and 12B are diagrams illustrating a rotor applicable to axial motors. FIG. 12A illustrates a single axial motor and FIG. 12B illustrates a double axial motor. In the case of the axial motor, the back iron 200 may be disposed on one side of the plurality of magnets 100 so as to face one side of the plurality of magnets 100.

Meanwhile, in the present invention, the magnet may be a high-temperature magnet made of samarium cobalt (SmCo). In the case of the Halbach motor, the flux generated by the current flowing in the winding of the stator affects the magnet to increase the iron loss of the flux and increase the temperature of the magnet accordingly, thereby demagnetizing the magnet. Therefore, the Halbach motor generally uses the high-temperature magnet to prevent the demagnetization of the magnet. According to the present invention, by providing a cooling system inside the back iron, it is possible to prevent the demagnetization of the magnet by performing heat exchange of the magnet through the back iron. In this case, since the magnet is prevented from becoming high temperature through the heat exchange, a low-cost neodymium magnet may be used instead of an expensive SmCo high-temperature magnet as the magnet.

Hereinafter, a method for manufacturing the rotor of the present invention will be described. As a general method, a rotor can be manufactured by first magnetizing each magnet, and attaching each magnetized magnet to the outer circumferential surface of the back iron. In this method, since each magnet is pre-magnetized, when attaching each magnet to the outer circumferential surface of the back iron, there is a difficulty in attaching the magnets by the attractive/repulsive force acting between the magnets.

In order to solve this problem, in the present invention, only the circumferential magnet is pre-magnetized and attached to the outer circumferential surface of the back iron, and the remaining magnets are attached to the outer circumferential surface of the back iron in a non-magnetized state, and then, the remaining magnets may be applied in the radial direction through the magnetizer. That is, a plurality of non-magnetized magnets are prepared, only some of the magnets are magnetized in the circumferential direction and provided on the back iron, and the remaining non-magnetized magnets are installed on the rest of the back iron, and then the non-magnetized magnets are magnetized in the radial direction to manufacture the rotor. Thereafter, the sleeve may be further provided outside the plurality of magnets to surround the plurality of magnetized magnets. Here, the installation means that the magnet is fixedly attached to the back iron by using an adhesive member, and when a slip bump is provided on the back iron, may mean that the groove of the magnet is inserted into the slip bump and at the same time, the magnet is fixedly attached to the back iron using the adhesive member. According to the method, the assembly may be improved compared to installing each magnetized magnet on the back iron after pre-magnetization of all magnets. Meanwhile, as an example for magnetizing the non-magnetized magnet in the radial direction, the back iron to which the magnet is attached may be put into the magnetizer, and then magnetized by the magnetizer.

Although exemplary embodiments of the present invention have been described with reference to the accompanying drawings, those skilled in the art will appreciate that various modifications and alterations may be made without departing from the spirit or essential feature of the present invention. Therefore, it should be understood that the above-mentioned embodiments are exemplary in all aspects but are not limited thereto.

DETAILED DESCRIPTION OF MAIN ELEMENTS

100: Plurality of magnets
110: Radial magnet
110a: Unit radial magnet
115: Groove of radial magnet
120: Circumferential magnet
125: Groove of circumferential magnet
200: Back iron
250: Non-slip bump
300: Sleeve
a: Length of outer arc of radial magnet
b: Length of outer arc of circumferential magnet
c: Outer radius of rotor
d: Thickness of sleeve
e: Thickness of magnet
f: Thickness of back iron

The invention claimed is:

1. A Halbach rotor of motor, comprising:
a plurality of magnets that include a radial magnet and a circumferential magnet that are Halbach-arrayed along a circumferential direction; and
a back iron that is provided on one side of the plurality of magnets so as to face one surface of the plurality of magnets,
wherein the back iron provides a path so that an inter-pole leakage flux generated from an inner radial magnet of any one of the plurality of magnets leads to another outer radial magnet near any one inner radial magnet,
wherein a length of an outer arc of the radial magnet is longer than that of an outer arc of the circumferential magnet,
wherein a length a of an outer arc of the radial magnet, a length b of an outer arc of the circumferential magnet, a thickness e of the plurality of magnets, and a thickness f of the back iron are provided as design variables, wherein $$0.52 \leq a/(a+b) \leq 0.81, \text{ and}$$

$$0.46 \leq e/(e+f) \leq 0.82.$$

2. The Halbach rotor of motor of claim 1, wherein the a and f have a nonlinear proportional relationship.

3. The Halbach rotor of motor of claim 1, wherein the back iron is disposed inside the plurality of magnets to face an inner circumferential surface of the plurality of magnets, and
a plurality of non-slip bumps protruding in a radial direction and spaced apart from each other in the circumferential direction are provided on an outer circumferential surface of the back iron.

4. The Halbach rotor of motor of claim 3, wherein
grooves are formed at both ends of an inner side surface of each of the plurality of magnets, and
the non-slip bumps are inserted into the grooves, and each of the plurality of magnets is disposed between each of the plurality of non-slip bumps.

5. The Halbach rotor of motor of claim 3, further comprising:
a sleeve that is provided on the outside of the plurality of magnets to surround the plurality of magnets.

6. The Halbach rotor of motor of claim 1, wherein
the back iron
is disposed outside the plurality of magnets so as to face an outer circumferential surfaces of the plurality of magnets.

7. A Halbach rotor of motor, comprising:
a plurality of magnets that include a radial magnet and a circumferential magnet that are Halbach-arrayed along a circumferential direction; and
a back iron that is provided on one side of the plurality of magnets so as to face one surface of the plurality of magnets,
wherein the back iron provides a path so that an inter-pole leakage flux generated from an inner radial magnet of any one of the plurality of magnets leads to another outer radial magnet near any one inner radial magnet,
wherein a length of an outer arc of the radial magnet is longer than that of an outer arc of the circumferential magnet,
wherein a length a of an outer arc of the radial magnet, a length b of an outer arc of the circumferential magnet, a thickness e of the plurality of magnets, and a thickness f of the back iron are provided as design variables,
wherein the radial magnet is formed of a plurality of unit radial magnets having the same size and shape as each other,
wherein $a/(a+b)=0.75$, the radial magnet is formed of three unit radial magnets having the same size and shape as each other, and
each of the unit radial magnets and the circumferential magnets has the same size and shape as each other,
wherein $0.46 \leq e/(e+f) \leq 0.63$.

* * * * *